Oct. 18, 1938.  R. S. WALKER ET AL  2,133,931
AIR FILTERING APPARATUS
Filed Nov. 27, 1936  3 Sheets-Sheet 1
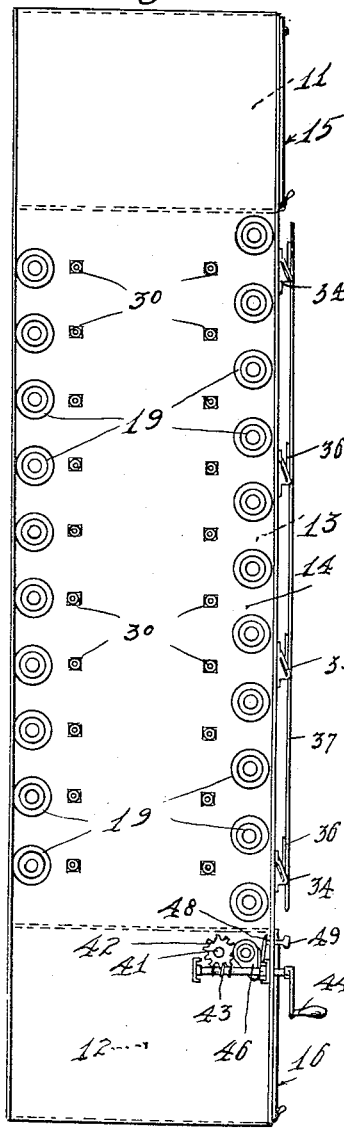
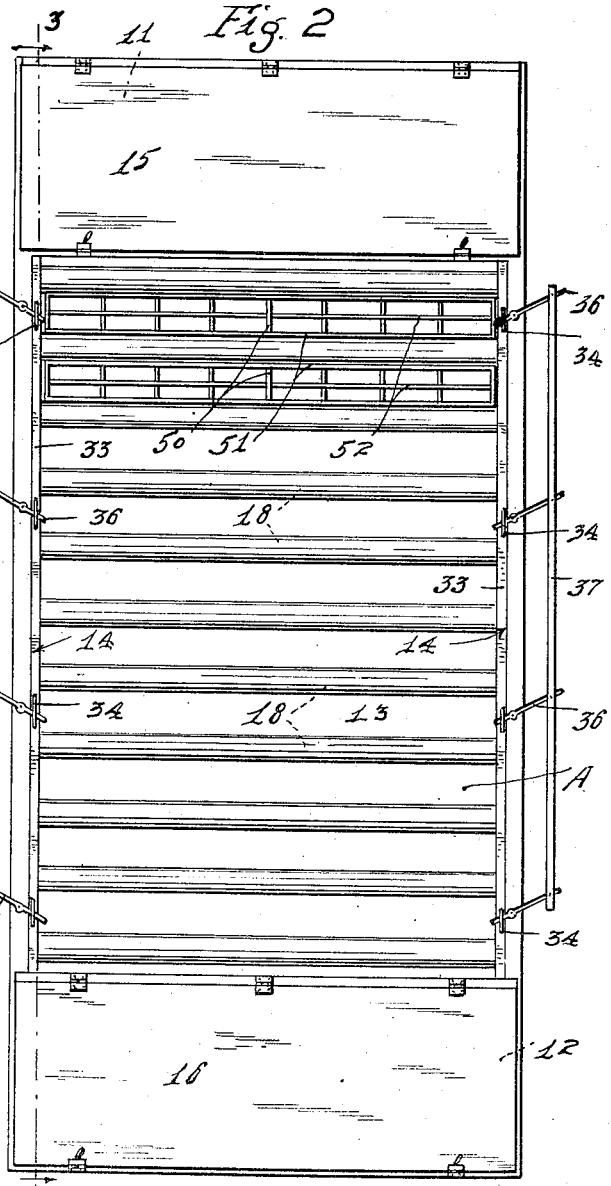
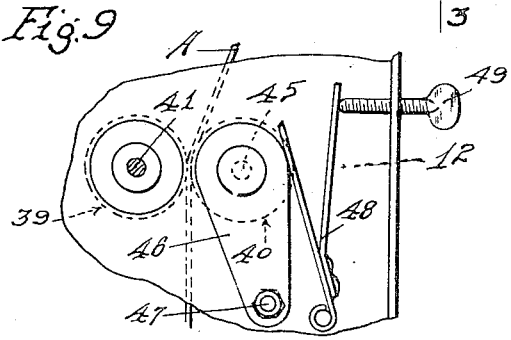
INVENTORS
Russell S. Walker
Warren S. Moore
By their Attorneys
Merchant & Kilgore

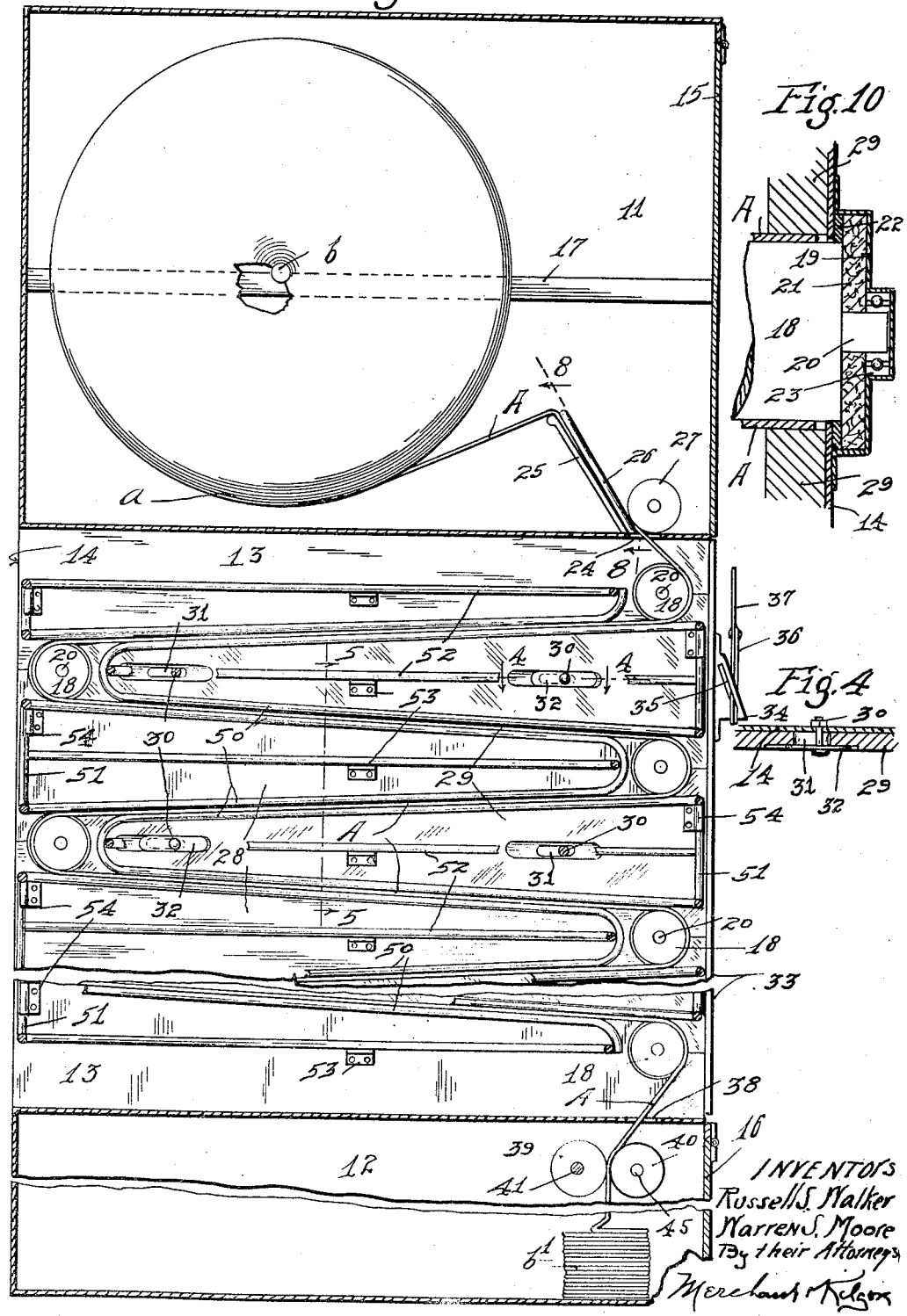

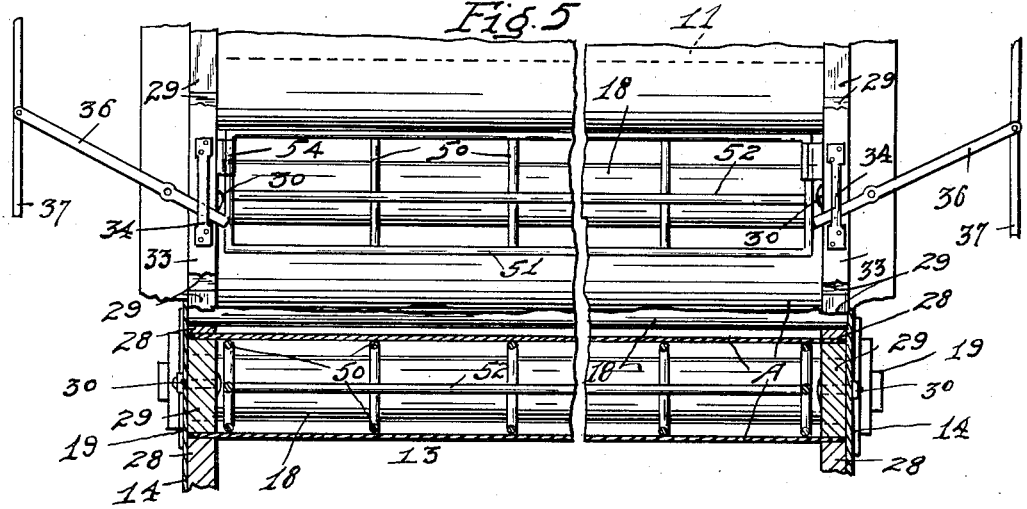
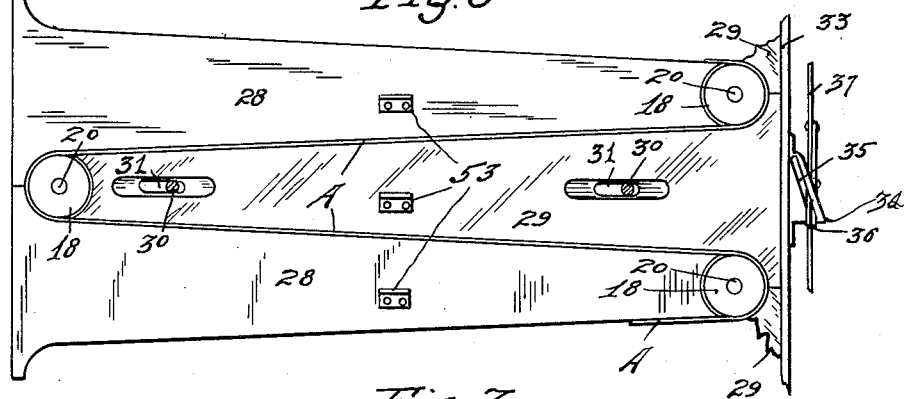
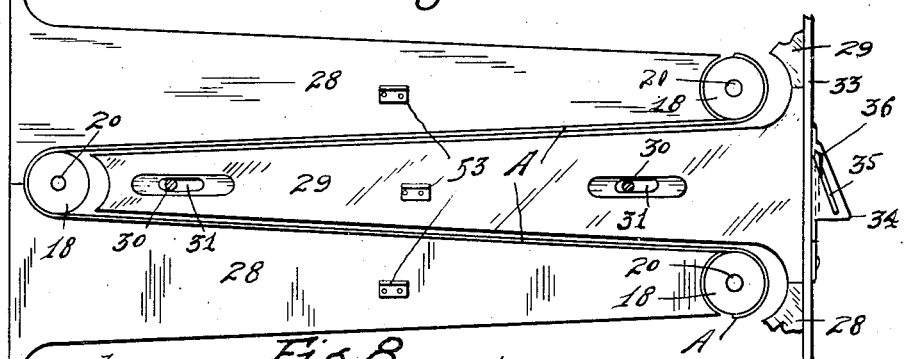
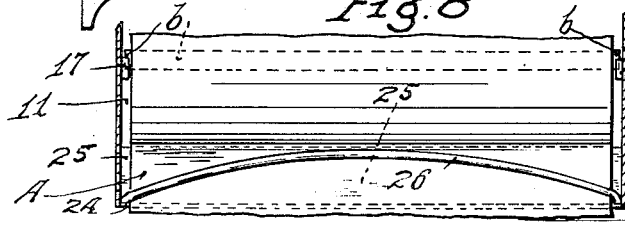

Patented Oct. 18, 1938

2,133,931

UNITED STATES PATENT OFFICE 2,133,931

AIR FILTERING APPARATUS

Russell S. Walker and Warren S. Moore, Duluth, Minn., assignors to Universal Air Filter Corporation, Duluth, Minn., a corporation of Minnesota Application November 27, 1936, Serial No. 112,864

8 Claims. (Cl. 183—62)

Our invention relates generally to an air filtering structure or apparatus and is directed particularly to such apparatus designed for high efficiency and capacity. Air filters, while adapted for general use, are especially adapted for use in connection with air conditioning apparatus, wherein a large amount of air must be cleaned per unit of time, cost of installation and maintenance. This improved air filter meets all of the desirable conditions above stated.

As an important feature of the invention means is provided for securely holding and, when desired, for adjusting a long flexible sheet of filtering material while held in zigzag arrangement, so that a very large area of filtering surface is contained within relatively small space.

Generally stated the invention consists of the novel device, combinations of devices, and arrangement of parts hereinafter described and defined in the claims. The accompanying drawings illustrate the preferred form of the invention.

Referring to the drawings, wherein like characters indicate like parts throughout the several views:

Fig. 1 is a side elevation showing one of the air filtering units;

Fig. 2 is a front elevation of the filtering unit shown in Fig. 1, some parts being removed;

Fig. 3 is a section taken on the line 3—3 of Fig. 2, some parts being shown in full;

Fig. 4 is a fragmentary section taken on the line 4—4 of Fig. 3;

Fig. 5 is a view showing some parts in elevation and some parts sectioned on the irregular line 5—5 of Fig. 3, some parts being broken away;

Fig. 6 is a detail in elevation showing a portion of the filtering media, guide rollers therefor, and wedge-shaped clamping rails interposed between the cleaning media;

Fig. 7 is a view corresponding to Fig. 6 but showing one of the retractable wedge-acting clamping rails retracted to release its clamping action on the fitering media;

Fig. 8 is a fragmentary section taken approximately on the line 8—8 of Fig. 3;

Fig. 9 is a fragmentary detail in elevation showing the pulling rollers for moving the sheet-like filtering media; and Fig. 10 is a fragmentary detail partly in elevation and partly in vertical section, showing one of the guide rollers and the mounting thereof.

In the particular design of filtering apparatus illustrated there is provided a casing made up of a closed upper compartment 11, a closed lower compartment 12, and an intermediate chamber 13. The intermediate chamber 13 is opened both at front and at rear, and it is formed between laterally spaced side plates 14 that rigidly connect the upper and lower compartments. As shown, the upper compartment 11 is provided with a hinge door 15, and the lower compartment 12 is provided with a hinge door 16. The filtering media is in the form of a long sheet A. It is preferably slightly wider than the space between the side plates 14; and hence, the compartments 11 and 12 are also preferably made slightly wider than the space between said upper and lower compartments, all for a purpose which will presently appear. The filtering media may take various forms, but in practice we have found that the best results can be obtained by making the said filtering sheet of cotton, reinforced on one side with muslin, and on the other side with cheese cloth. This filtering sheet will usually be in a large roll $a$ contained on a spindle $b$, the ends of which are shown as mounted on horizontal rails 17 that lead from the door 16 along the side walls of compartment 11 and are notched to afford seats for the ends of the spindle $b$, as best shown in Fig. 3.

In passing through the open compartment or air passage 13 the filtering sheet A is caused to take a zigzag course over suitable alternately staggered guides, preferably in the form of rollers 18 mounted in bearings on side plates 14. The rollers 18 are extended through large openings in the side plates 14 and slightly projected into bearings or boxes 19 secured on the outer sides of said side plates. The projecting shafts or trunnions 20 of the rollers 18 extend through heavy air-sealing felt washers 21 mounted in the said boxes and spaced slightly from the side plates 14 by spacing rings 22. To reduce the friction the trunnions 20, as shown, are mounted in ball bearings 23 held in projections of the boxes 19.

The filtering sheet, as above indicated and clearly shown in Fig. 3, is caused to travel over the rollers 18 on a zigzag course or, in other words, to take the form of a manifold sheet in which the folds are spaced apart by the said rollers. On its way from the roll $a$, the filtering sheet A, in going to the first or uppermost roller 18, passes to a slot 24 in the bottom of a compartment 11. Also in passing the said first roller 18, the sheet A is in this preferred arrangement, and, for a reason, moved over an oblique ironing board or flange 25 that is secured to the bottom of a compartment 11 and leads to the opening 24. The movement of the sheet A over the board 25 flattens or straightens the same out; and to insure complete spreading and smoothing of the sheet, it is passed under a spreader yoke 26 that is anchored at its lower end to the bottom of the compartment 11, see Figs. 3 and 8, and yieldingly presses the sheet against said board 25. Also, as shown, the sheet A runs under an idle presser roll 27, before it reaches the uppermost roller 18.

The edges of the filtering sheet A throughout their zigzag course pass between the adjacent parallel edges of alternately arranged wedge-shaped clamping rails 28 and 29. The rails 28 all taper in the same direction, and the rails 29 all taper in the same way but in an opposite direction from the rails 28. The rails 28 are permanently and rigidly secured to the side plates 14, while the rails 29 are retractable. The rails 29, as shown, are mounted for sliding movements on transverse rods 30, see Figs. 5, 6 and 7, that extend from side wall 14 and are secured thereto. These rods pass through longitudinal slots 31 in said rails 29 and are equipped with closures 32 that keep the slots 31 closed against the passage of air therethrough. The outer ends of the rails 28 and 29 are flared and curved to substantially fit against the portions of the filtering sheet that is on the adjacent rollers 18.

In the arrangement illustrated the air is supposed to be blown or forced through the filtering media in a direction from right toward the left in respect to Fig. 3. In this arrangement, as above stated, the wedge rails 29 are retractable. To accomplish simultaneous movement of the rails 29 into positions shown in Fig. 7, I provide a controller or actuator, one form of which is illustrated in the drawings and involves the following elements. The outer ends of the several rails 29 are rigidly secured to a vertical tie bar 33. On the tie bar 33, see particularly Figs. 3, 5, 6 and 7, are cam blocks 34 having oblique slots 35, in which work the short ends of levers 36, intermediately pivoted to one of side plates 14 and tied together at their outer ends by a long link 37, see also Figs. 1 and 2.

After the filtering sheet A is passed through the large guide roller 18, it is passed through a slot 38 in the plate of compartment 12, and from thence between the pulling rollers 39 and 40. In the arrangement illustrated, the roller 39 is carried by a shaft 41 journaled in suitable fixed bearings on the side plates of the compartment 12, and said shaft 41 at its outer end, as shown, is provided with a worm gear 42 that meshes with the worm gears 43 mounted in suitable bearings on one of the outer plates of the compartment 12 and provided with an operating crank 44.

The roller 40 is carried by a shaft 45 that is journaled in the free ends of links 46 pivoted at 47 to the outer sides of the opposite end plates of the lower compartment 12, and which end plates are provided with slots to clear and permit slight movements of said roller 40. The roller 40 is yieldingly pressed toward the roller 39 by springs 48 that are subject to adjustable buttons in the form of screws 49, see particularly Fig. 9. The rollers 39 and 40 will be of any suitable material but are preferably provided with pliable faces such as would be afforded by soft rubber coverings.

When the movable clamping rails 29 are forced inward to operative positions, as shown in Fig. 6, the edges of the filtering sheet A will be firmly clamped and held against displacement, but when the sheets are wide and the air pressure against the same is strong, there will be a tendency to stretch the intermediate portions of the filtering sheet. To prevent this latter action there are provided skeleton-like wedge-shaped racks. Preferably these racks are made of wire and, as shown, comprise U-shaped wires 50, rectangular yokes 51, and longitudinally extended intermediate wires 52, all of which elements 50, 51 and 52, are rigidly united by spot welding or otherwise, so that they constitute a complete unit. These racks are wedge shaped or tapered, so that they fit the spaces between the folds of the filtering sheet, and they are opened alternately from opposite sides or from front to rear of the air passage or intermediate compartment 13, as best shown in Fig. 3. Said racks are detachably held in place by suitable means such as rest lugs 53 and spring clips 54. The rest lugs 53 are applied to the clamp rails 28 and 29 and engage under the wires 52 that are adjacent thereto. The clips 54 engage the ends of the yokes 51. The spring clips 54 which are also applied to the clamp rails 28 and 29 and engage the ends of the yokes 51 with a spring action.

In the illustration given it is assumed that the dust-laden air will be forced through the air passage 13 and against the filtering sheet A in a direction from right toward the left in respect to Fig. 3, in which instance it will be the racks which are opened from the left toward the right, against which the filtering sheet A will be forced by the air pressure; and in this case the racks opened from the right toward the left may be dispensed with. However, with the racks opened from both sides, air may be delivered through the filtering apparatus in either direction.

The filtering sheet A delivered from the rollers 39 and 40 may be received and handled in any suitable way, but, as shown, it is accumulated in a pile b' within the lower compartment 12, as shown in Fig. 3.

In the arrangement illustrated and by application of the wedge-shaped clamping rails 28 and 29, the filtering sheet A will be held at its ends against movement either longitudinally or laterally.

When the sheet is to be moved to replace the dust-laden portion by a clean portion, the retractable rails 29 are, as already described, moved to releasing position shown in Fig. 7, so that a new and clean section of the filtering sheet may be brought into position. In making this movement into position of new and clean filtering material, the sheet runs between the rails 28 and 29, and its edges will not lose their position between the rails; or if at some point, the edges of the sheet should run from between the rails, they will be naturally brought back between the same by tension and movement of the sheet so that the sheet will be in position to be reclamped by re-application of the moved rails 29. If at any time it should be desired to impart a slow continuous movement to the sheet A, the clamping rails 29 would have to be at least slightly retracted so as not to press the edges of the sheet against the rails 28. Also if continuous movement of the sheet were desired, it might be easily accomplished by the application of mechanical or electric power to the pulling roll 39.

From the foregoing it will be understood that while we have described the preferred embodiment of the invention, that the same is capable of various modifications within the scope of the

What we claim is:

1. In an apparatus of the kind described, a casing having an air passage for the movement of air therethrough, a filtering sheet spanning said air passage, means for holding the sheet in zigzag manifold arrangement comprising reversely arranged interlapping clamping rails normally clamping and holding the edges of said filtering sheet, means for slightly separating the opposing interlapping rails and mechanically holding the same but slightly separated so as to then form a non-clamping zigzag guide channel for the edges of the filtering sheet, and means for moving said filtering sheet longitudinally when thus released from the clamping action of said clamping rails.

2. The structure defined in claim 1 in which the clamping rails on the one side are connected for common receding movements.

3. The structure defined in claim 1 in further combination with a tie bar connecting the clamping rails on the one side of the filtering sheet for common receding movements, and manually operated means operative on said tie bar for moving the retractable guide rails simultaneously to releasing positions and simultaneously back to clamping positions.

4. In an apparatus of the kind described, a casing having an air passage for the movement of air therethrough, a filtering sheet spanning said air passage, means for holding said sheet in zigzag manifold arrangement comprising reversely-arranged interlapping clamping rails normally clamping and holding the edges of said filtering sheet but releasable therefrom, means for moving said sheet longitudinally when released from the gripping action of said clamping bars, the clamping rails on the one side of said casing being retractable, and a tie bar connecting the said retractable clamping rails for simultaneous movements to and from operative positions, in further combination with manually-operated means operative on said tie bar for moving the same and the retractable clamping rails that are connected thereto, means for action on said tie bar, comprising cam lugs on the latter, and co-operating levers.

5. In an apparatus of the kind described, a casing having an air passage for the movement of air therethrough, a filtering sheet spanning said air passage, means for holding said sheet in zigzag manifold arrangement, comprising guide rollers and reversely arranged interlapping clamping rails normally clamping and holding the edges of said filtering sheet but releasable therefrom, said rollers at their ends being projected through the sides of said casing and journaled outside of said casing, and sealing washers interposed between said bearings, casing, and ends of said rollers.

6. The structure defined in claim 5, and in which said clamping rails are applied to the inner surfaces of the side walls of said casing.

7. In an apparatus of the kind described, a casing having an air passage for the movement of air therethrough, a filtering sheet spanning said air passage, means for holding said sheet in zigzag manifold arrangement, comprising guide rollers and reversely-arranged interlapping clamping rails normally clamping and holding the edges of said filtering sheet but releasable therefrom, in further combination with means for releasing the pressure of said clamping rails on the edges of said filtering sheet so that the sheet may be moved longitudinally to replace the soiled section of the filtering sheet by an unsoiled portion thereof, and manually operated means comprising pressure rolls operative on said sheet to move the same as described.

8. The structure defined in claim 1 in further combination with skeleton racks inserted into the spaces between the folds of said filtering sheet between the clamped edges thereof.

RUSSELL S. WALKER.
WARREN S. MOORE.